May 23, 1967 H. JOHANSSON 3,321,713
FREQUENCY STABILIZED MULTIVIBRATOR
Filed April 4, 1966
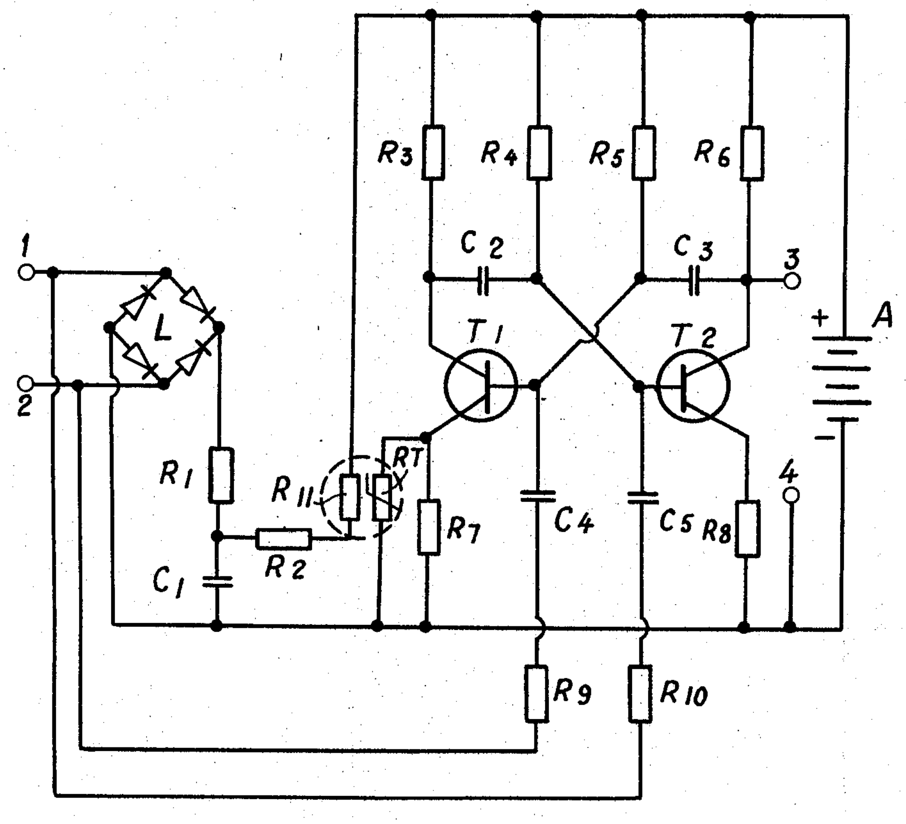
Inventor
Hans Johansson
By Cushman, Darby & Cushman
Attorneys 3,321,713
Patented May 23, 1967

3,321,713

FREQUENCY STABILIZED MULTIVIBRATOR

Hans Johansson, Huddinge, Sweden, assignor to Billman-Regulator A.-B., Huddinge, Sweden, a Swedish company Filed Apr. 4, 1966, Ser. No. 539,846
Claims priority, application Sweden, Apr. 13, 1965, 4,876/65
7 Claims. (Cl. 331—66)

The present invention relates to multivibrators and particularly to means therein for securing frequency stability by means of a thermistor.

A known great problem in connection with oscillation generators in general is the difficulty of maintaining the frequency stable. External influences, such as temperature variations of the ambient atmosphere, as well as the characteristics of the components forming part of the oscillator often affect the generated frequency adversely. Usually said drawback can be eliminated merely by the use of a considerable number of well chosen components having an extremely good quality, particularly in respect of temperature insensitivity and aging.

It has been proposed earlier to stabilize transistorized oscillators by inserting a thermistor in the base electrode circuit in order to have the base electrode voltage vary with the temperature, thereby compensating variations of the conductivity of the transistor with the temperature. In an attempt to obtain good temperature compensation it has also been suggested to insert in the collector circuit a semiconductive diode having the same temperature characteristic as the transistor.

The present invention presents another solution of the problem of creating an oscillation generator satisfying servere demands in respect of frequency stability and requiring merely a small number of low-cost components, and the main feature, whereby said object is reached, consists in the insertion of a negative thermistor in the emitter circuit of at least one of the transistors.

Said and other features and advantages of the invention will now be more closely described with reference to the accompanying drawing which shows a preferred embodiment of the invention.

The drawing shows a bi-stable multivibrator generating a voltage of square wave shape between the output terminals 3, 4. The multivibrator comprises two transistors T1 and T2, each one having its base electrode connected to the collector electrode of the other transistor via a condenser C2 or C3. Said condensers together with the resistors R4, R5 determine the natural frequency of the multivibrator which is also dependent to some extent upon the leakage currents of the transistors and upon the voltage remaining between the collector and the negative terminal when the transistors are conductive. Silicone transistors are preferred for the present use, because said kind of transistors show very small leakage currents, so that it is possible in practice to disregard them when calculating the natural frequency of the multivibrator. The multivibrator shown is meant to be used for driving a synchronous timepiece, and therefore it is completed with means for synchronization with the frequency of the general power supply system (the mains) and with means for charging an accumulator A. In case of failure of the mains, said battery takes over the power supply of the multivibrator.

The mains terminals 1, 2 are connected to two opposite diagonal points of a full-wave rectifier bridge L, the other two diagonal points of which are connected to output terminal 4, one of them directly and the other one via resistors R1, R2 and the accumulator A. Condenser C1 serves for smoothing the rectified current. Via emitter resistors R7, R8 the emitter electrodes of the transistors are connected to terminal 4, and via resistors R9, R10 and condensers C4, C5 their base electrodes are connected each to a separate one of the mains terminals 1, 2. Due to said latter connection the mains frequency is applied to the two base electrodes and forces the multivibrator to deviate slightly from its natural frequency so as to oscillate in synchronism therewith. In accordance with the invention, in parallel to the emitter resistor R7 there is connected a thermistor RT consisting of a semiconductive member, the resistance of which has a negative temperature coefficient, i.e. its resistance value drops with rising temperature. Adjacent said thermistor there is placed a heating resistor R11 which in series with the resistors R1, R2 is connected in the line connecting the rectifier bridge L to one pole of the accumulator and carrying the charging current. The base electrodes of the transistors are connected to said pole via the resistors R4, R5, and the collector electrodes of the transistors are connected thereto via the collector resistors R3, R6.

The temperature coefficient of the condensers forming part of the multivibrator, is negative. When the ambient temperature of the multivibrator varies, the temperature coefficient of the components involves a corresponding ferquency variation, the direction of which is such that the frequency rises when the ambient temperature rises. In order to compensate for said phenomena, a component having a great positive temperature coefficient might have been useful, but in the present case there is no such component available that is suitable.

Therefore instead, the present invention is based upon the principle of obtaining the compensation by influencing the voltage remaining between the collector electrode and the negative pole of a transistor when conductive. The magnitude of said voltage can be influenced by varying the resistance in the emitter circuit of the transistor. The desired result is obtained by associating a negative thermistor with the common emitter resistor.

The oscillation frequency is determined by the expression $$f=\frac{1}{t_1+t_2}$$

wherein $t_1$ and $t_2$ are the two parts forming together the time period of a full cycle. If said part time periods could be held constant, $f$ would also be held constant. The part times can be expressed as follows:

$$t_1=T_1 \ln \frac{U_m+U_k}{U_m-U_{b2\ \text{cut-off}}}$$

$$t_2=T_2 \ln \frac{U_m+U_k}{U_m-U_{b1\ \text{cut-off}}}$$

where $T_1=R_4C_2$, $T_2=R_5C_3$, $U_m$=feed voltage
$U_{b\ \text{cut-off}}$=the base electrode voltage when the respective transistor starts to conduct,
$U_k$=the voltage range covered by the collector voltage during the charging period. Said voltage range decreases if the voltage remaining between the collector and the negative pole (when the transistor is conductive) is raised.

The temperature dependency of the components gives rise to variations of the time constant T. If $t$ should be maintained constant, then the expression $$\ln=\frac{U_m+U_k}{U_m-U_{\text{cut-off}}}$$

should vary to the same extent but in the opposite direction. However, in said expression $U_m$ and $U_{\text{cut-off}}$ are constant, so that merely the possibility of influencing $U_k$ remains. $U_k$ is built up of the collector-to-emitter voltage and the emitter voltage (above the potential of the common line connected to the negative pole of the accumulator), and therefore, if the emitter voltage could be varied, e.g. by completing the emitter resistor with a negative thermistor, then the desired result would be obtained, i.e. $U_k$ would increase when the ambient temperature rises. As in this case the pulse-interval-ratio is not decisive to any significant extent, compensation of merely one of the emitter circuits of the transistors will suffice. The frequency drift still remaining after the introduction of said compensation is very slight, under the provision that the thermistor is properly dimensioned and that the variation of the ambient temperature lies within the range of 10 to 60 degrees centigrade.

When trimming a multivibrator suitable for the present application, its oscillation frequency should be adjusted to 60 cycles per second as closely as possible. Normally, when the mains are live, the multivibrator is forcefully synchonized by the mains frequency, as above described, but then the natural frequency of the multivibrator should be adjusted to a lower value than the mains frequency. To that end the natural frequency of the multivibrator is lowered, when connected to the mains, by having the above-mentioned resistor R11 heat the thermistor RT used for the temperature compensation. Preferably, in this manner the natural frequency of the multivibrator is adjusted to deviate about 2 c./s. from the frequency of the mains as soon as the resistor R11 is heating the thermistor.

The invention is not restricted to the embodiment shown in the drawing, the details of which may be varied within the scope of the invention defined by the following claims.

I claim:

1. Circuit for stabilizing the frequency of a multivibrator subjected to variations of the ambient temperature; said multivibrator comprising two transistors having their base and collector electrodes mutually cross-connected via frequency determining members, characterised in that the emitter circuit of at least one of the transistors comprises a negative thermistor, whereby variations of the ambient temperature will bring said thermistor to influence the emitter voltage in such a manner as to compensate the variations of the collector voltages of the transistors caused by said temperature variations.

2. Circuit as claimed in claim 1, characterized in that the thermistor is connected in parallel to a common emitter resistor.

3. Circuit as claimed in claim 1, characterized in that a heating resistor is placed in heat transferring relation to the thermistor.

4. Circuit as claimed in claim 1, characterized in that the base electrodes of the transistors via suitable circuit members are connected each to a separate one of the terminals of a power supply system in order to synchronize the frequency of the multivibrator with that of said system.

5. In a multivibrator circuit, comprising two transistors, each one having its base electrode connected via a condenser to the collector electrode of the other transistor and having its emitter electrode connected via an emitter resistor to one and the same terminal of a current supply source, the collector and base electrodes of the transistors being connected via separate resistors to the other terminal of said source, a thermistor being connected in parallel to said emitter resistor of one of the transistors, said thermistor having a negative resistance coefficient, whereby frequency variations of the multivibrator caused by changes of the ambient temperature are compensated.

6. Multivibrator circuit as claimed in claim 5, in which said current source consists of an accumulator charged by an A.C. power network via a rectifier bridge, characterised in that each of the base electrodes of the transistors is connected via coupling members to a separate one of the terminals of said A.C. network, whereby the frequency of the multivibrator is synchronized with said network when under tension.

7. Multivibrator circuit as claimed in claim 6, characterised in that a heating resistor fed by said A.C. network is in heat transferring relation to said thermistor, the natural frequency of the multivibrator being influenced by the variation of the resistance of said thermistor when said network fails and the accumulator supplies current to the circuit.

No references cited.

ROY LAKE, *Primary Examiner.*

J. KOMINSKI, *Assistant Examiner.*